(12) United States Patent
Duffy et al.

(10) Patent No.: US 10,626,752 B2
(45) Date of Patent: Apr. 21, 2020

(54) FLEXIBLE PRELOADED BALL BEARING ASSEMBLY

(71) Applicant: United Technologies Corporation, Farmington, CT (US)

(72) Inventors: Kevin Duffy, Hartford, CT (US); Ronnie K. Kovacik, Manchester, CT (US); Michael Gantt, Granby, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 210 days.

(21) Appl. No.: 15/850,912

(22) Filed: Dec. 21, 2017

(65) Prior Publication Data
US 2019/0195088 A1 Jun. 27, 2019

(51) Int. Cl.
| | | |
|---|---|---|
| *F01D 25/16* | (2006.01) | |
| *F16C 25/08* | (2006.01) | |
| *F02C 7/06* | (2006.01) | |
| *F16C 35/04* | (2006.01) | |
| *F16C 27/08* | (2006.01) | |
| *F16C 19/52* | (2006.01) | |
| *F16C 19/16* | (2006.01) | |
| *F16C 19/54* | (2006.01) | |

(Continued)

(52) U.S. Cl.
CPC .............. *F01D 25/164* (2013.01); *F02C 7/06* (2013.01); *F16C 19/16* (2013.01); *F16C 19/525* (2013.01); *F16C 19/54* (2013.01); *F16C 25/08* (2013.01); *F16C 25/083* (2013.01); *F16C 27/08* (2013.01); *F16C 35/04* (2013.01); *F05D 2240/54* (2013.01); *F16C 19/546* (2013.01); *F16C 19/55* (2013.01); *F16C 27/066* (2013.01); *F16C 2360/23* (2013.01)

(58) Field of Classification Search
CPC ........ F01D 25/162; F01D 25/164; F02C 7/06; F16C 23/06; F16C 25/06; F16C 35/04
See application file for complete search history.

(56) References Cited

U.S. PATENT DOCUMENTS

| | | | |
|---|---|---|---|
| 3,738,719 A | * | 6/1973 | Langner ................ F16C 25/083 384/517 |
| 3,909,085 A | | 9/1975 | Wilkinson et al. |
| 4,173,376 A | | 11/1979 | Standing et al. |

(Continued)

FOREIGN PATENT DOCUMENTS

| | | |
|---|---|---|
| CH | 239592 A | 10/1945 |
| CN | 102588449 A | 7/2012 |

(Continued)

OTHER PUBLICATIONS

Extended European Search Report for European Application No. 18241203.4; Date of Completion: Apr. 11, 2019; dated Apr. 18, 2019; 9 Pages.

*Primary Examiner* — Dwayne J White
*Assistant Examiner* — Jackson N Gillenwaters
(74) *Attorney, Agent, or Firm* — Cantor Colburn LLP

(57) ABSTRACT

A preloaded ball bearing assembly includes a primary bearing assembly disposed between a rotating component and a static structure. The assembly also includes a preload bearing assembly disposed in contact with the rotating component. The assembly further includes a flexible support disposed between the primary bearing assembly and the preload bearing assembly.

20 Claims, 6 Drawing Sheets

(51) Int. Cl.
*F16C 27/06* (2006.01)
*F16C 19/55* (2006.01)

(56) References Cited

U.S. PATENT DOCUMENTS

| | | | | |
|---|---|---|---|---|
| 4,721,441 | A | * | 1/1988 | Miyashita ............. F01D 25/164 |
| | | | | 384/518 |
| 4,927,326 | A | * | 5/1990 | von Pragenau ....... F01D 11/025 |
| | | | | 415/170.1 |
| 5,316,393 | A | | 5/1994 | Daugherty |
| 6,048,101 | A | | 4/2000 | Rasmussen |
| 6,409,390 | B1 | | 6/2002 | Bouzakis et al. |
| 6,971,801 | B2 | * | 12/2005 | Miyazaki ............. F16C 25/083 |
| | | | | 384/504 |
| 7,178,987 | B2 | | 2/2007 | Bridges et al. |
| 8,439,637 | B2 | * | 5/2013 | DiBenedetto ........... F02C 3/107 |
| | | | | 415/229 |
| 8,469,597 | B2 | | 6/2013 | Smith et al. |
| 9,322,292 | B2 | | 4/2016 | Berhan |
| 2003/0048965 | A1 | | 3/2003 | Miyazaki et al. |
| 2011/0123326 | A1 | | 5/2011 | DiBenedetto et al. |
| 2012/0192570 | A1 | * | 8/2012 | McCune ................ F01D 25/18 |
| | | | | 60/792 |
| 2015/0362013 | A1 | | 12/2015 | Gorajski et al. |

FOREIGN PATENT DOCUMENTS

| | | |
|---|---|---|
| DE | 4112253 A1 | 10/1992 |
| DE | 102014219731 A1 | 3/2016 |
| GB | 1553360 | 11/1978 |
| WO | 2015026600 A1 | 2/2015 |

* cited by examiner

FLEXIBLE PRELOADED BALL BEARING ASSEMBLY

BACKGROUND

Exemplary embodiments pertain to the art of gas turbine engines and, more particularly, to a preloaded ball bearing assembly for use in gas turbine engines.

Ball bearings are commonly used in gas turbine engines. They position the rotation parts of the engine relative to the static parts and transfer radial and axial loads from the rotor to the static structure. In a preloaded ball bearing arrangement, two ball bearings are positioned in close proximity. They are loaded against each other, with a load either pushing the outer rings apart or pulling them together.

Multiple benefits are achieved with preloaded ball bearings. They reduce radial and axial displacement of a rotor, when compared to a single ball bearing. Additionally, they increase moment stiffness in comparison to a single ball bearing. However, preloaded ball bearings may suffer from premature failure if thermal growth and associated displacement increase the axial preload above the capability of one or both of the bearings.

Prior arrangements of preloaded ball bearings have used a configuration with a preload spring combined with an outer ring which can float in a radial clearance. The drawback of this approach is that thermal growth can cause the gap between the bearing and housing to close, resulting in a preload which overloads the bearing and causes premature failure.

SUMMARY

Disclosed is a preloaded ball bearing assembly. The assembly includes a primary bearing assembly disposed between a rotating component and a static structure. The assembly also includes a preload bearing assembly disposed in contact with the rotating component. The assembly further includes a flexible support disposed between the primary bearing assembly and the preload bearing assembly.

In addition to one or more of the features described above, or as an alternative, further embodiments may include a flange extending from the static structure and in contact with the primary bearing assembly to axially position the primary bearing assembly.

In addition to one or more of the features described above, or as an alternative, further embodiments may include that the flexible support is in contact with the preload bearing assembly.

In addition to one or more of the features described above, or as an alternative, further embodiments may include that the flexible support is integrally formed with the preload bearing assembly.

In addition to one or more of the features described above, or as an alternative, further embodiments may include that the primary bearing assembly comprises a primary ball bearing, a primary bearing outer ring, and a primary bearing inner ring, the primary bearing inner ring in contact with the shaft, the primary bearing outer ring in contact with the static structure and the flange.

In addition to one or more of the features described above, or as an alternative, further embodiments may include that the preload bearing assembly comprises a preload ball bearing, a preload bearing outer ring, and a preload bearing inner ring, the preload bearing inner ring in contact with the shaft, the preload bearing outer ring in contact with the flexible support.

In addition to one or more of the features described above, or as an alternative, further embodiments may include that the preload bearing outer ring and the static structure define a radial clearance therebetween, the flexible support disposed within the radial clearance.

In addition to one or more of the features described above, or as an alternative, further embodiments may include that the flexible support comprises at least a portion of a wave segment.

In addition to one or more of the features described above, or as an alternative, further embodiments may include that the flexible support comprises a plurality of wave segments forming a sinusoidal wave.

In addition to one or more of the features described above, or as an alternative, further embodiments may include that each of the plurality of wave segments are U-shaped.

In addition to one or more of the features described above, or as an alternative, further embodiments may include that the flexible support comprises at least one spiral ring extending between the preload bearing assembly and the primary bearing assembly.

In addition to one or more of the features described above, or as an alternative, further embodiments may include that the flexible support comprises a solid beam extending between the preload bearing assembly and the primary bearing assembly.

Also disclosed is a gas turbine engine including a compressor section, a combustion section, a turbine section, a shaft extending axially along a longitudinal centerline of the gas turbine engine, and a preloaded ball bearing assembly. The preloaded ball bearing assembly includes a primary bearing assembly disposed between, and in contact with, the shaft and a static structure. The preloaded ball bearing assembly also includes a flange extending from the static structure to axially position the primary bearing assembly. The preloaded ball bearing assembly further includes a preload bearing assembly disposed in contact with the shaft. The preloaded ball bearing assembly yet further includes a flexible support disposed between, and in contact with, the flange and the preload bearing assembly to axially position the preload bearing assembly.

In addition to one or more of the features described above, or as an alternative, further embodiments may include that the flexible support is integrally formed with the preload bearing assembly.

In addition to one or more of the features described above, or as an alternative, further embodiments may include that the primary bearing assembly comprises a primary ball bearing, a primary bearing outer ring, and a primary bearing inner ring, the primary bearing inner ring in contact with the shaft, the primary bearing outer ring in contact with the static structure and the flange.

In addition to one or more of the features described above, or as an alternative, further embodiments may include that the preload bearing assembly comprises a preload ball bearing, a preload bearing outer ring, and a preload bearing inner ring, the preload bearing inner ring in contact with the shaft, the preload bearing outer ring in contact with the flexible support.

In addition to one or more of the features described above, or as an alternative, further embodiments may include that the preload bearing outer ring and the static structure define a radial clearance therebetween, the flexible support disposed within the radial clearance.

In addition to one or more of the features described above, or as an alternative, further embodiments may include that the flexible support comprises at least a portion of a wave segment.

In addition to one or more of the features described above, or as an alternative, further embodiments may include that the flexible support comprises at least one spiral ring extending between the preload bearing assembly and the primary bearing assembly.

In addition to one or more of the features described above, or as an alternative, further embodiments may include that the flexible support comprises at least one solid beam extending between the preload bearing assembly and the primary bearing assembly.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
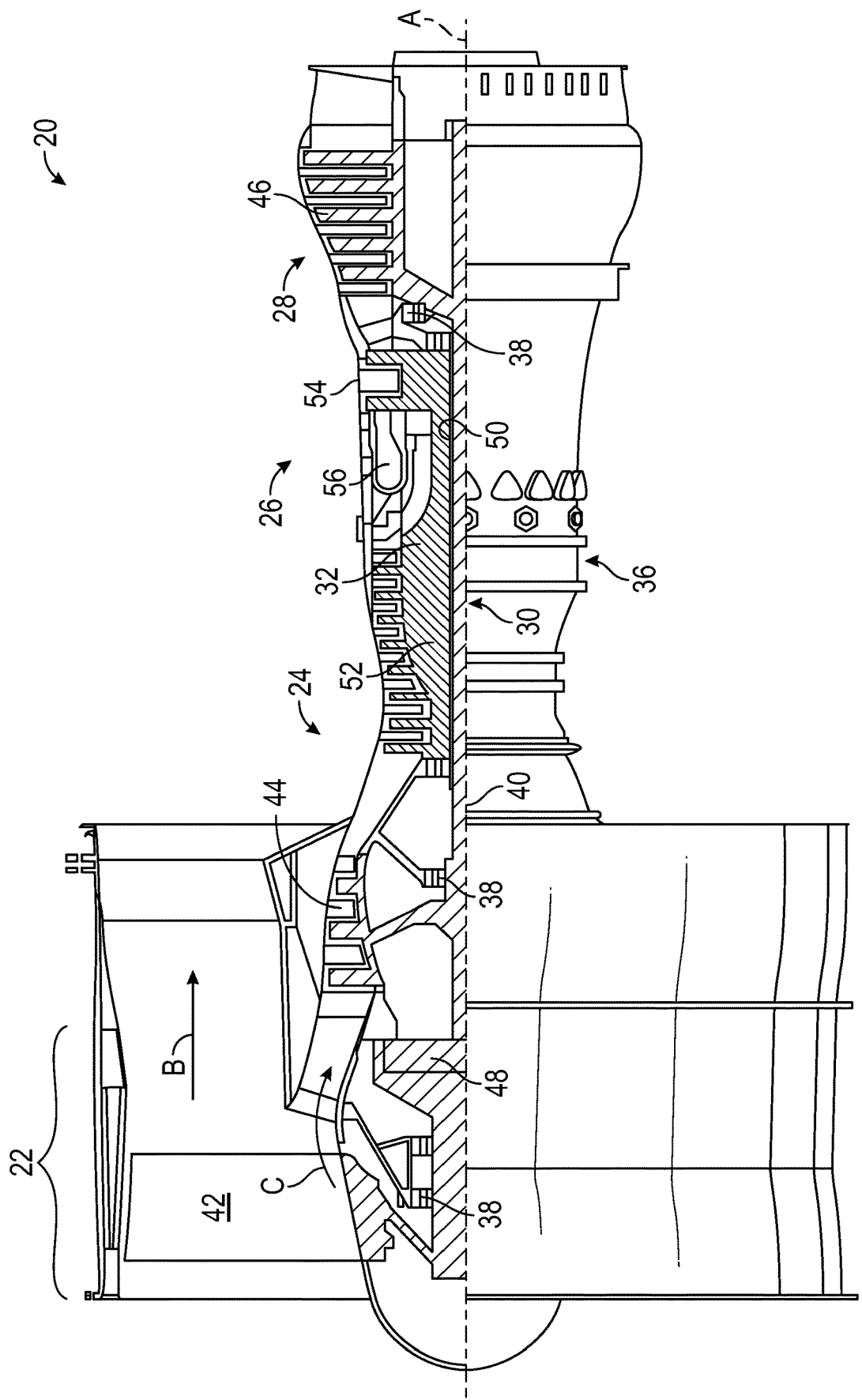
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °\text{ R})/(518.7° \text{ R})]^{0.5}$. The "Low corrected fan tip speed" as disclosed herein according to one non-limiting embodiment is less than about 1150 ft/second (350.5 m/sec).

Figure 2:
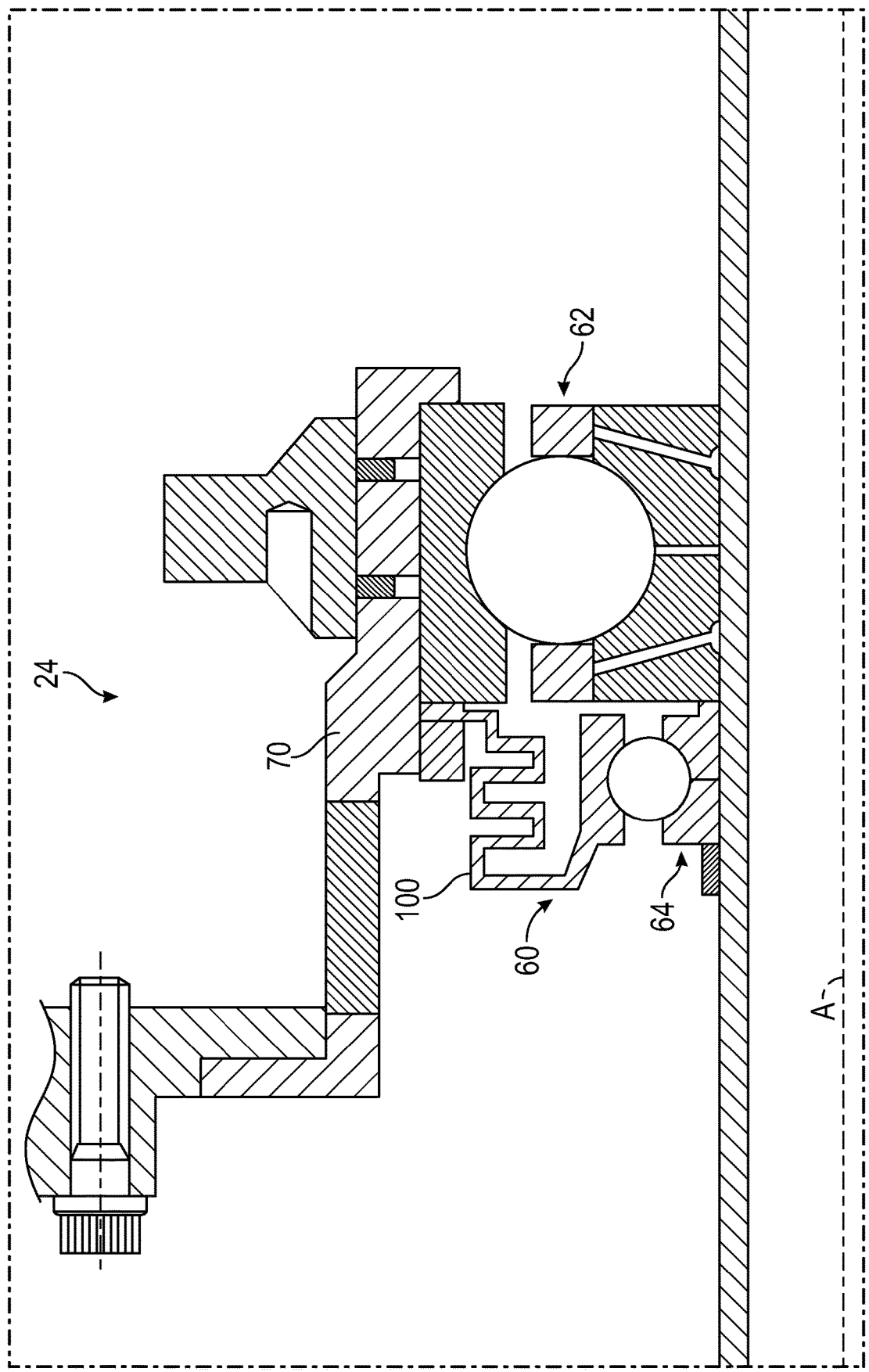
FIG. 2 is a partial cross-sectional view of a portion of the gas turbine engine with a preloaded ball bearing assembly.

Referring now to FIG. 2, illustrated is a preloaded ball bearing assembly 60. The preloaded ball bearing assembly 60 may be located at various contemplated locations within the gas turbine engine 10. In the illustrated embodiment, the ball bearing assembly 60 is located in the compressor section 24. The ball bearing assembly 60 includes a primary bearing assembly 62 and a preload bearing assembly 64. The ball bearing assembly 60 positions a rotating component 68 and a static component 70, relative to each other. In the illustrated embodiment, the rotating component 68 is a rotating shaft, such as shaft 40 or 50, with the static structure 70 positioned radially outward of the rotating component 68. A flexible support 100 is positioned between the primary bearing assembly 62 and the preload bearing assembly 64 and is described in detail herein.

Figure 3:
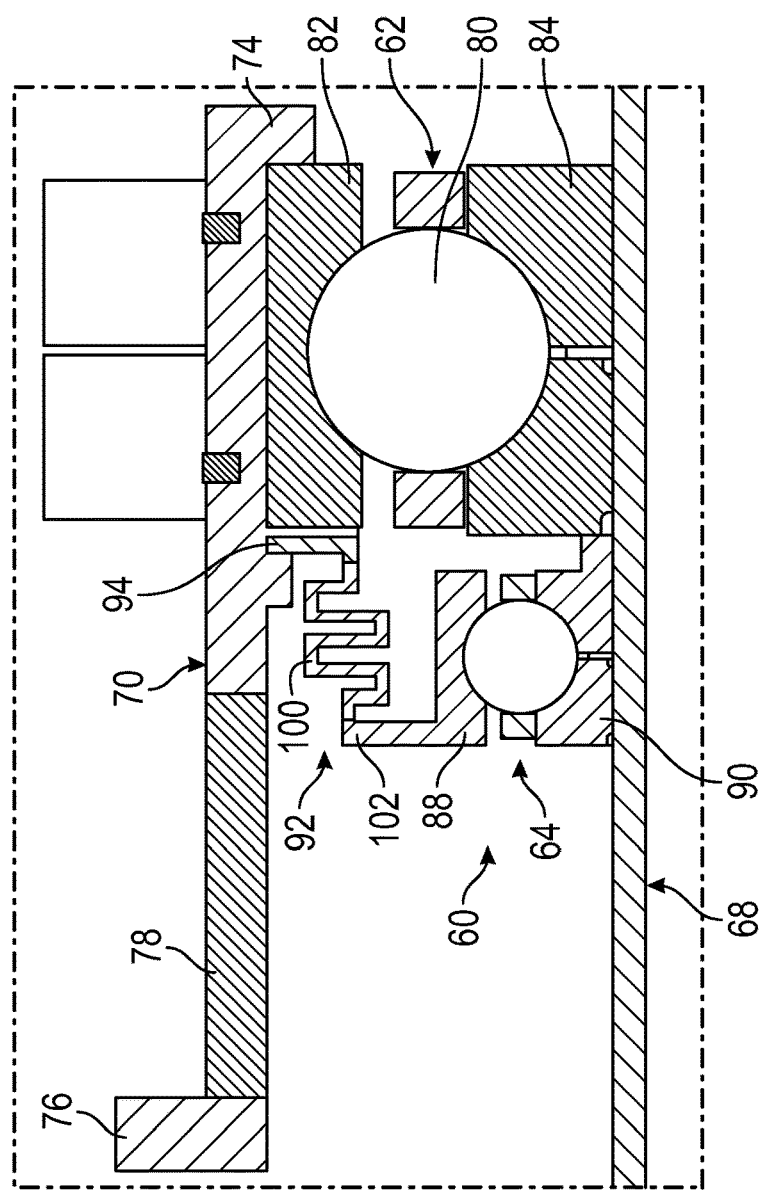
FIG. 3 is an elevational view of the preloaded ball bearing assembly according to an aspect of the disclosure.

Referring now to FIG. 3, the ball bearing assembly 60 is illustrated in isolation. The ball bearing assembly 60 is disposed between the rotating component 68 and the static structure 70, as described above. Features of the static structure 70 are illustrated, but it is to be appreciated that the features embody merely an example of the static structure with which the ball bearing assembly 60 could be utilized. In the illustrated example, the static structure includes an outer ring 74 positioned relative to a ring flange 76 with one or more centering spring beams 78. The bearing outer ring 82 can be integral with the static structure 74.

The primary bearing assembly 62 includes a primary ball bearing 80 retained within a primary bearing outer ring 82 and a primary bearing inner ring 84. Similarly, the preload bearing assembly 64 includes a preload ball bearing 86 retained within a preload bearing outer ring 88 and a preload bearing inner ring 90. Each inner ring 84, 90 is disposed in contact with the rotating component 68. The primary bearing outer ring 82 is disposed in contact with the static structure 70, but the preload bearing outer ring 88 is spaced radially inward of the static structure 70 to define a clearance 92 therebetween. The axial load on the preload bearing assembly 64 is lower than that of the primary bearing assembly 62, thus allowing for the preload bearing assembly 64 to be smaller than the primary bearing assembly 62.

A flange 94 extends radially inwardly from the static structure 70 and may be integrally formed therewith. The flange 94 is in abutment with a face of the primary bearing outer ring 82 to axially position the primary bearing assembly 62. Disposed within the clearance 92—made possible by the smaller preload bearing assembly 64—between the preload bearing assembly 64 and the static structure 70 is a flexible support 100 that rigidly attaches the preload bearing assembly 64 to the static structure 70. The rigid attachment is achieved by disposing the flexible support 100 in contact with the preload bearing assembly 64 and the flange 94. The contact between the flexible support 100 and the preload bearing assembly 64 may be made in various contemplated manners, but in the illustrated embodiment, the flexible support 100 is an integrally formed component, relative to the preload bearing assembly 64, and is integral with the preload bearing outer ring 88. In other embodiments, the flexible support 100 is formed separately from the preload bearing outer ring 88.

Figure 4:
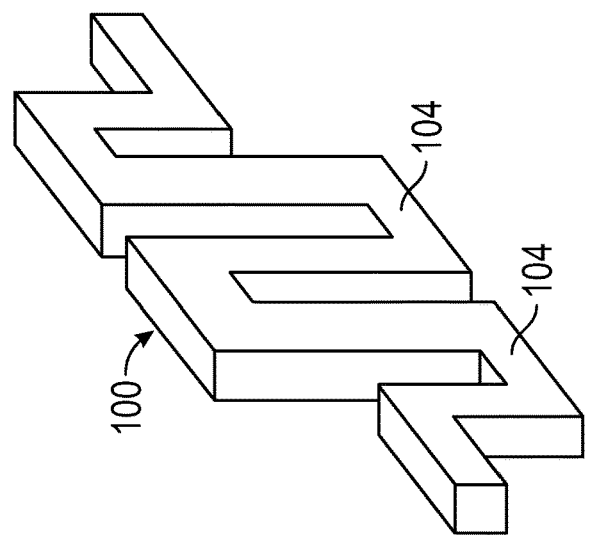
FIG. 4 is a perspective view of a flexible support of the preloaded ball bearing assembly of FIG. 3.

Referring to FIG. 4, the flexible support 100 according to the embodiment shown in FIGS. 2 and 3 is illustrated in greater detail. As shown, the flexible support 100 includes a substantially sinusoidal wave in an axial direction of the flexible support 100. In particular, the flexible support 100 includes at least a portion of a wave segment. A portion of a wave segment refers to the possibility that less than a full wave may be present, such as a half-wave, for example. In other embodiments, a plurality of complete waves are present, such as the two full wave shown. It is to be understood that any number of wave segments (whole or half segments) may be included. The wave segments 104 may be substantially U-shaped, with right angles, as shown, or may include smoother curvature along portion(s) of the wave segments 104.

The flexible support 100 may be formed of any suitable material that provides a spring-like characteristic. The flexible support 100 may therefore be tuned to an axial and radial spring rate that allows for a rigid connection between the bearing assemblies 62, 64 while pushing the preload bearing assembly 64 away from the primary bearing assembly 62. The spring rate of the flexible support 100 is achieved by using the above-described wave shaped geometry. The flexible support 100 may be a full ring of material that extends circumferentially or windows may be cut into the flexible support 100 so that the flexible support 100 forms narrow beams, as illustrated.

Figure 5:
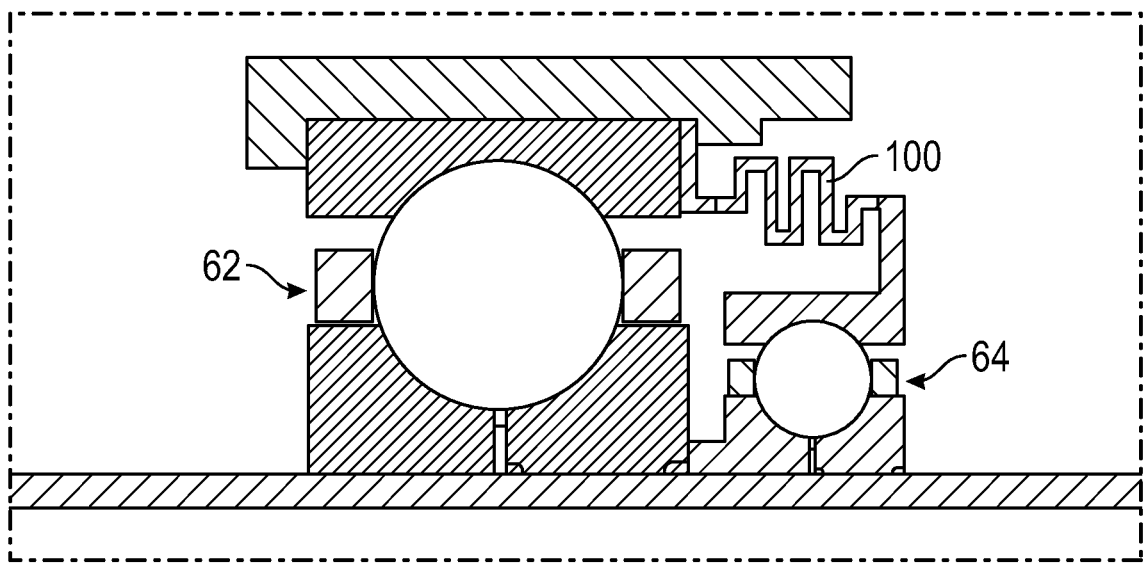
FIG. 5 is an elevational view of the preloaded ball bearing assembly according to another aspect of the disclosure.

Referring now to FIG. 5, the same type of flexible support 100 is employed, but the relative axial positioning of the primary bearing assembly 62 and the preload bearing assembly 64 is reversed from the arrangement of FIGS. 2 and 3.

Figure 6:
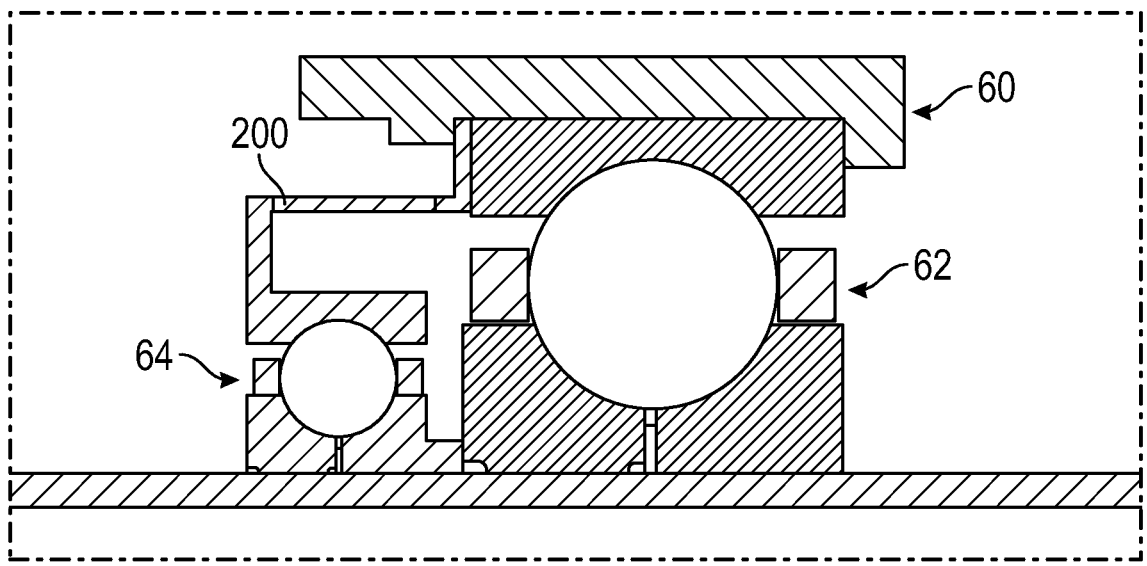
FIG. 6 is an elevational view of the preloaded ball bearing assembly according to another aspect of the disclosure.
Figure 7:
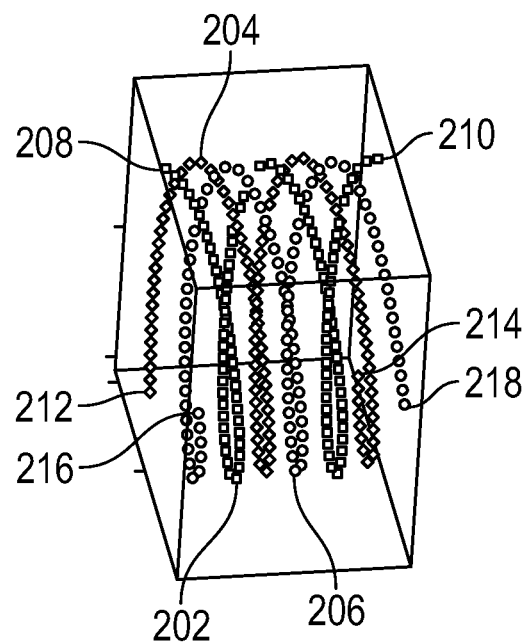
FIG. 7 is a perspective view of a flexible support of the preloaded ball bearing assembly of FIG. 6.

Referring now to FIGS. 6 and 7, the ball bearing assembly 60 is illustrated with another embodiment of the flexible support, the flexible support of FIGS. 6 and 7 referenced with numeral 200. The primary bearing assembly 62 and the preload bearing assembly 64 are illustrated and have been described in detail above in connection with the above-described embodiments. The flexible support 200 includes at least one spiral beam. The spiral beam(s) extend circumferentially in one or more loops, while extending axially from a spiral beam first end to a spiral beam second end.

In the illustrated embodiment of FIG. 7, three spiral beams are illustrated, with each spiral beam extending to complete two loops. Specifically, a first spiral beam 202, a second spiral beam 204 and a third spiral beam 206 are shown. The first spiral beam 202 includes a first end 208 and a second end 210, the second spiral beam 204 includes a first end 212 and a second end 214, and the third spiral beam 206 includes a first end 216 and a second end 218. The first ends 208, 212, 216 are in contact with the preload bearing assembly 64 in any of the above-described manners, and the second ends 210, 214, 218 are in contact with the flange 94.

The spiral beams 202, 204, 206 are each located in the same radial positions, but have their respective ends circumferentially spaced from each other. In some embodiments, the circumferential spacing of the ends is an even spacing of the ends. For example, in the three spiral beam embodiment of the FIG. 7, the first ends 208, 212, 216 of the spiral beams 202, 204, 206 are each spaced 120 degrees from each other. While illustrated and described above as a three spiral beam embodiment, it is to be understood that fewer or more spiral beams may be included and a different number of loops may be formed. The spiral beam(s) may be formed of any suitable material that provides a spring-like characteristic. The flexible support 200 may therefore be tuned to an axial and radial spring rate that allows for a rigid connection between the bearing assemblies 62, 64 while pushing the preload bearing assembly 64 away from the primary bearing assembly 62.

Figure 8:
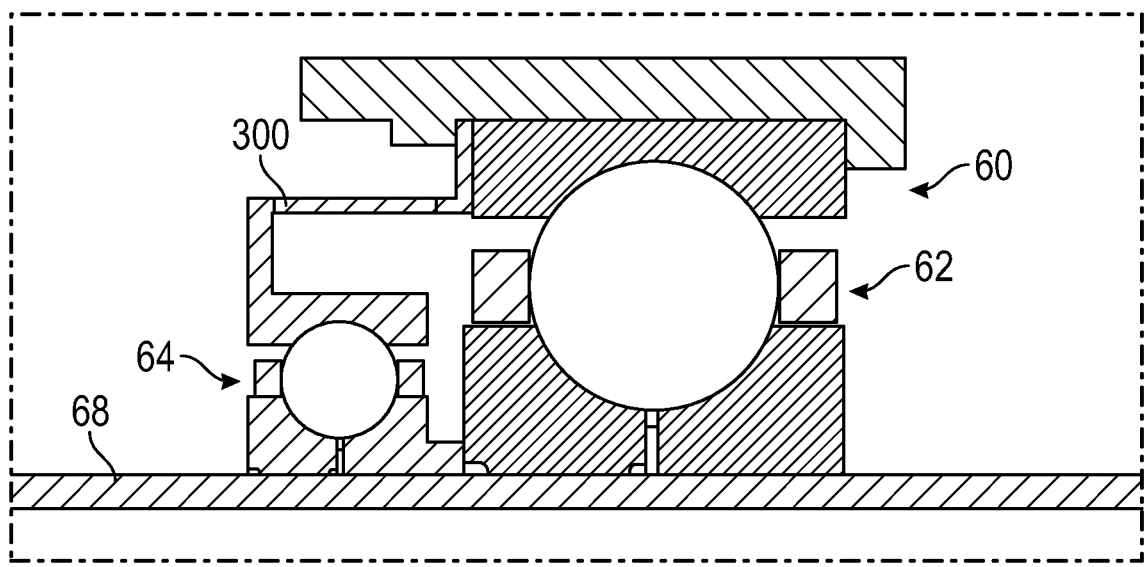
FIG. 8 is an elevational view of the preloaded ball bearing assembly according to another aspect of the disclosure.

Referring now to FIG. 8, the ball bearing assembly 60 is illustrated with another embodiment of the flexible support, the flexible support of FIG. 8 referenced with numeral 300. The primary bearing assembly 62 and the preload bearing assembly 64 are illustrated and have been described in detail above in connection with the above-described embodiments. The flexible support 300 includes a hoop of material extending circumferentially about the rotating component 68. In some embodiments a full hoop is provided. In other embodiments, circumferential segments of a hoop are provided.

Figure 9:
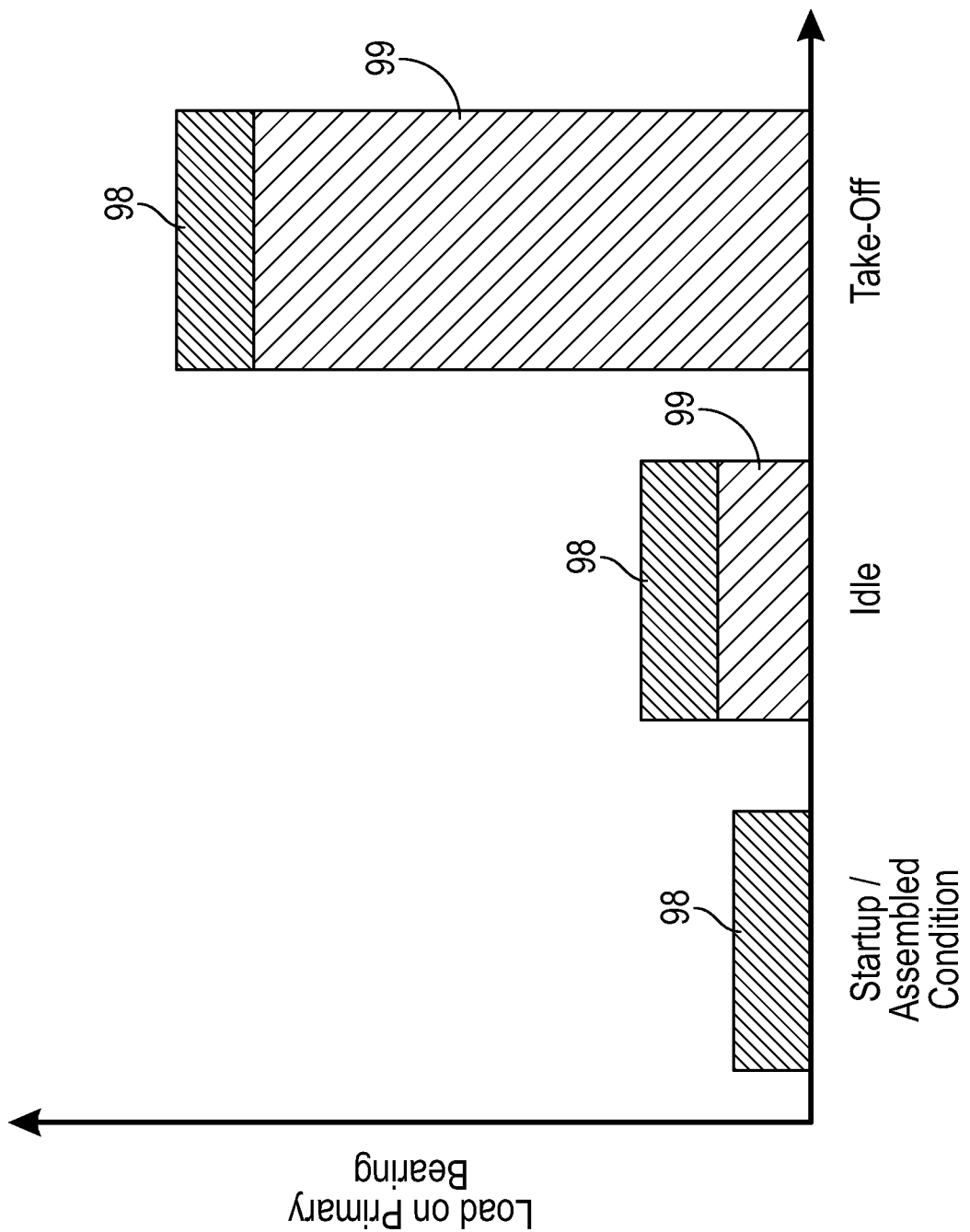
FIG. 9 is a graphical representation illustrating loads on a primary bearing at different operating conditions.

The embodiments disclosed herein provide an axially flexible bearing support that results in a preloaded bearing set which is insensitive to thermal growth of the bearing or support. This results in improved durability of the preload bearing assembly 64. The embodiments do not rely on a loose fit bearing to accommodate axial movement, thereby reducing the risk of the bearing seizing in the clearance and being overloaded. The total load on the primary bearing assembly 62 at three system operating conditions is illustrated in FIG. 9. The total load is broken up into a first load portion 98 from the preload bearing assembly 62 and a second load portion 99 from other loads on the rotating component, such as aerodynamic loads or gear loads. In particular, a startup, or assembled, condition is shown with the total load being the first load portion 98. Next, an idle condition and a take-off condition are shown. In each operating condition, the first load portion 98 attributed to the preload bearing assembly 64 is advantageously constant.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A preloaded ball bearing assembly comprising:
   a shaft;
   a static structure;
   a primary bearing assembly disposed between the shaft and the static structure;
   a preload bearing assembly disposed in contact with the shaft; and
   a flexible support formed with the preload bearing assembly as a unitary element and disposed between the primary bearing assembly and the preload bearing assembly.

2. The preloaded ball bearing assembly of claim 1, further comprising a flange extending from the static structure and in contact with the primary bearing assembly to axially position the primary bearing assembly.

3. The preloaded ball bearing assembly of claim 2, wherein the flexible support is in contact with the preload bearing assembly.

4. The preloaded ball bearing assembly of claim 2, wherein the primary bearing assembly comprises a primary ball bearing, a primary bearing outer ring, and a primary bearing inner ring, the primary bearing inner ring in contact with the shaft, the primary bearing outer ring in contact with the static structure and the flange.

5. The preloaded ball bearing assembly of claim 1, wherein the preload bearing assembly comprises a preload ball bearing, a preload bearing outer ring, and a preload bearing inner ring, the preload bearing inner ring in contact with the shaft, the preload bearing outer ring in contact with the flexible support.

6. The preloaded ball bearing assembly of claim 5, wherein the preload bearing outer ring and the static structure define a radial clearance therebetween, the flexible support disposed within the radial clearance.

7. The preloaded ball bearing assembly of claim 1, wherein the flexible support comprises at least a portion of a wave segment.

8. The preloaded ball bearing assembly of claim 1, wherein the flexible support comprises a plurality of wave segments forming a sinusoidal wave.

9. The preloaded ball bearing assembly of claim 8, wherein each of the plurality of wave segments are U-shaped.

10. The preloaded ball bearing assembly of claim 2, wherein the flexible support comprises at least one spiral ring extending between the preload bearing assembly and the primary bearing assembly.

11. The preloaded ball bearing assembly of claim 1, wherein the flexible support comprises a solid beam extending between the preload bearing assembly and the primary bearing assembly.

12. A gas turbine engine comprising:
   a compressor section;
   a combustion section;
   a turbine section;
   a shaft extending axially along a longitudinal centerline of the gas turbine engine; and
   a preloaded ball bearing assembly comprising:
      a primary bearing assembly disposed between, and in contact with, the shaft and a static structure;
      a flange extending from the static structure to axially position the primary bearing assembly;
      a preload bearing assembly disposed in contact with the shaft; and
      a flexible support formed with the preload bearing assembly as a unitary element and disposed between, and in contact with, the flange and the preload bearing assembly to axially position the preload bearing assembly.

13. The gas turbine engine of claim 12, wherein the flexible support is integrally formed with the preload bearing assembly.

14. The gas turbine engine of claim 13, wherein the primary bearing assembly comprises a primary ball bearing, a primary bearing outer ring, and a primary bearing inner ring, the primary bearing inner ring in contact with the shaft, the primary bearing outer ring in contact with the static structure and the flange.

15. The gas turbine engine of claim 12, wherein the preload bearing assembly comprises a preload ball bearing, a preload bearing outer ring, and a preload bearing inner ring, the preload bearing inner ring in contact with the shaft, the preload bearing outer ring in contact with the flexible support.

16. The gas turbine engine of claim 15, wherein the preload bearing outer ring and the static structure define a radial clearance therebetween, the flexible support disposed within the radial clearance.

17. The gas turbine engine of claim 12, wherein the flexible support comprises at least a portion of a wave segment.

18. The gas turbine engine of claim 13, wherein the flexible support comprises at least one spiral ring extending between the preload bearing assembly and the primary bearing assembly.

19. The gas turbine engine of claim 12, wherein the flexible support comprises at least one solid beam extending between the preload bearing assembly and the primary bearing assembly.

20. A preloaded ball bearing assembly comprising:
a shaft;
a static structure;
a primary bearing assembly disposed between the shaft and the static structure;
a preload bearing assembly disposed in contact with the shaft, the preload bearing assembly comprises a preload ball bearing, a preload bearing outer ring, and a preload bearing inner ring, the preload bearing inner ring in contact with the shaft; and
a flexible support disposed between the primary bearing assembly and the preload bearing assembly, wherein the preload bearing outer ring and the static structure define a radial clearance therebetween, a portion of the flexible support having a wave segment disposed within the radial clearance.

* * * * *